Oct. 9, 1945.   G. A. LYON   2,386,230
WHEEL STRUCTURE
Filed April 14, 1943   2 Sheets-Sheet 2
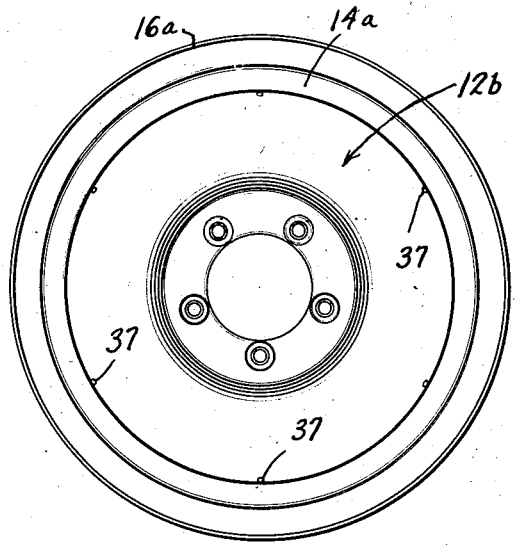
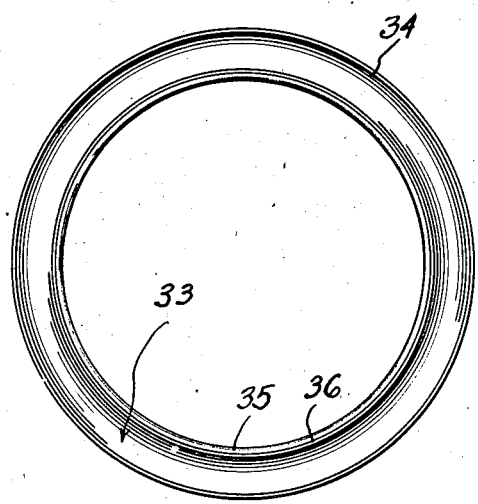
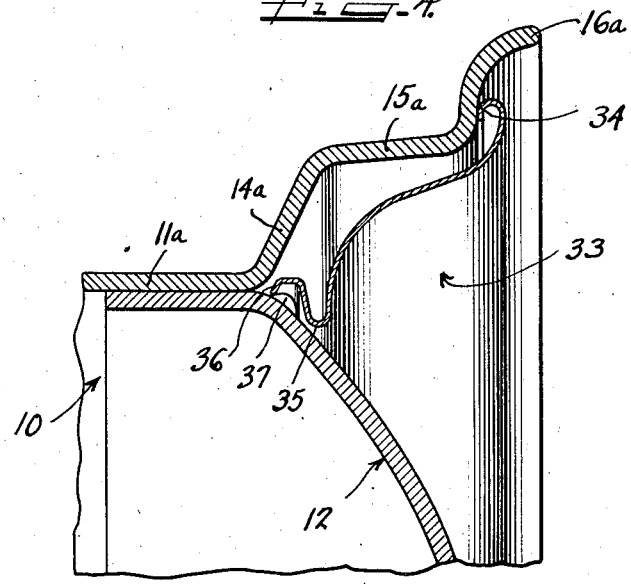
Inventor
GEORGE ALBERT LYON.
by Charles W. Hills
Attys.

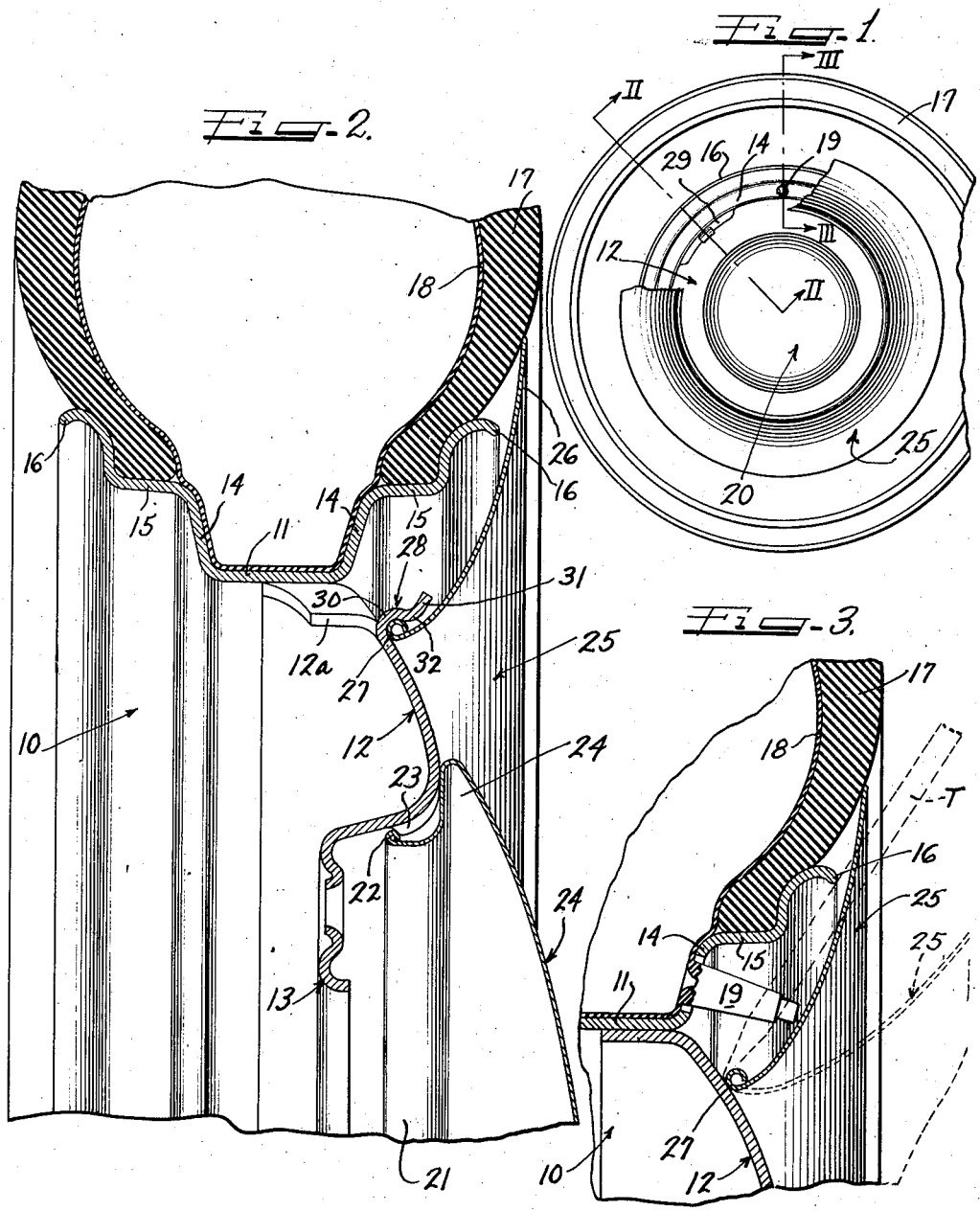

Patented Oct. 9, 1945

2,386,230

UNITED STATES PATENT OFFICE 2,386,230

WHEEL STRUCTURE

George Albert Lyon, Allenhurst, N. J.

Application April 14, 1943, Serial No. 483,030

1 Claim. (Cl. 41—10)

This invention is directed to an improved wheel structure and relates more particularly to an improved trim assembly therefor.

It is an important object of the invention to provide an improved retaining arrangement for securing a trim assembly over the outer side of a wheel structure.

Still another object of the invention is to provide a trim assembly for a wheel structure wherein a trim member is secured over the outer side of the wheel by virtue of retaining engagement of the trim member with the wheel structure itself.

In accordance with the general features of this invention there is provided herein a wheel structure including a multi-flange, drop center tire rim and a central load bearing portion having means formed at the radially outer part of the central load bearing portion to provide a cover receiving shoulder over which a peripheral part of a cover member may be engaged in snap-on pry-off relationship to secure the cover over the outer side of the wheel structure.

In accordance with other general features of this invention, there is provided herein a novel cover retaining arrangement for a cover assembly including a radially outer portion constructed so as to be resiliently flexible and have resiliently elastic characteristics such as those of a synthetic plastic or rubber, either natural or synthetic, whereby the cover may be flexed temporarily away from the wheel structure over which it is disposed to render the rear side thereof accessible and thus permitting radial outward extension of the marginal portion of the cover member beyond the edge portion of the tire rim in order to give the appearance of being a continuation of the side wall of the tire and the appearance of being the white side wall of a massive tire on a wheel structure of minimum dimensions when colored white. Furthermore, with such a cover construction the outer peripheral part thereof may flex or breathe temporarily under the influence of lateral expansion of the side wall of the tire when operated under load bearing conditions.

It is another object of this invention to provide a wheel construction and a cover assembly therefor wherein the cover may be quickly and easily, resiliently snapped into attached relationship with the wheel structure, this attached relationship being such that the cover member is securely maintained on the wheel during use but yet may be readily removed therefrom if desired.

Other objects and advantages of the invention will become apparent from the following description and accompanying drawings in which:

Figure 1 is a fragmentary side elevational view of a wheel constructed in accordance with my invention, parts being broken away for illustrative purposes;

Figure 2 is a cross-sectional view taken on the line II—II of Figure 1;

Figure 3 is a cross-sectional view taken on the line III—III of Figure 1;

Figure 4 is a fragmentary cross-sectional view of a wheel construction embodying a modified form of my invention;

Figure 5 is a side elevational view of a wheel structure constructed in accordance with Figure 4; and Figure 6 is a rear elevational view of a trim member constructed like that shown in Figure 4.

It will be understood that the embodiments shown herein are for illustrative purposes only and may be changed or modified without departing from the spirit and scope of the invention as set forth in the appended claims.

As shown in Figures 1, 2 and 3, 10 designates a well known form of a multi-flange, drop center tire rim, including a base flange 11 secured through welding or riveting or the like to a central load bearing portion or spider 12 having a rim engaging flange 12a at the radially outer part thereof and having a bolt-on flange 13 at the inner or central part thereof. The tire rim 10 is provided with opposite side flanges 14, opposite intermediate flanges 15 and opposite edge portions 16 into which a tire 17 having an inner tube 18 with a valve stem 19 may be fitted. As will be seen from Figure 3 one of the opposite side flanges 14 is provided with an aperture through which the valve stem 19 may project.

As will be seen from Figure 2 the central bolt-on flange 13 is depressed axially inwardly of the wheel structure and to the end that this part of the wheel structure may be ornamentally concealed, there is provided herein a hub cap simulating cover portion 20 having a resilient snap-on flange 21 terminating in a peripheral bead 22 which is arranged to be urged axially inwardly of the wheel structure and over circumferentially spaced humps 23 formed on the outer surface of the wheel structure. It will be seen that after the bead 22 has overridden the radially inwardly extending peaks of the humps 23, it will come to rest upon substantially axially inwardly facing surfaces of the humps whereby the radially outer extremity 24 of the hub cap member 20 will be drawn into tight compressed engagement with the adjacent portion of the outer surface of the body part 12.

The cover assembly shown herein is completed by the provision of an annular trim member 25 which, as indicated previously, may be constructed from a synthetic plastic or rubber, either synthetic or natural, in order that it have resiliently, elastically flexible characteristics enabling it to be flexed temporarily, locally away from the wheel structure to render the rear side thereof accessible. With a cover member having such flexible characteristics it is feasible to extend the outer margin 26 thereof radially outwardly beyond the edge portion 16 of the tire rim so as to conceal the junction between the edge portion and the side wall of the tire, this being possible because the cover or trim member 25 may flex locally to accommodate lateral expansion of the side wall of the tire when operated under load bearing conditions.

It will also be seen that the cross-sectional configuration of the cover member 25 is of such shape and magnitude that the outer part thereof, as explained above, may overlie a portion of the side wall of the tire, the radially inner part thereof extending radially inwardly over the outer side of the tire rim 10 to conceal the same and to conceal the tire valve stem 19 or other appurtenances associated with the tire rim 10 such as wheel balancing weights or the like. From Figures 1 and 3 it will be seen that the cover or trim member 25 extends radially inwardly over the junction between the tire rim 10 and the load bearing portion 12 of the wheel structure so that the inner marginal part thereof extends over and conceals the radially outer part of the central load bearing portion 12. This relatively massive cross-sectional expanse of the trim member constitutes, in effect, a continuation of the side wall of the tire 17 to give the appearance of being a part thereof and the appearance of being the white side wall of a massive tire on a wheel structure of minimum dimensions if it is colored white.

As will be seen clearly from Figures 1 and 3, the trim member 25 is provided at the radially inner edge thereof with a reinforcing curled part 27 which not only strengthens the cover at the radially inner part thereof but also affords an efficient attachment member for securing the cover to the wheel structure.

In order that the wheel structure may accommodate the inner peripheral edge of the cover member 25 in retained snap-on pry-off relationship the body portiton 12 of the wheel is itself configurated to provide retaining members 28.

As will best be seen from Figures 1 and 2, the attachment flange 12a of the body part is provided with circumferentially spaced depressed portions which afford circumferentially spaced apertures 29 at the junction of the tire rim 10 with the body part 12. It is these depressed portions of the flange 12a which are utilized to provide suitable retaining means for the cover member 25. In constructing the wheel the substantially central part of the depressed portions of the flange 12a is cut transversely to provide a separable tab of metal which is bent outwardly by any suitable method to provide a plurality of circumferentially spaced, integral retaining elements, each having an arcuate section 30 formed to afford a substantially axially outwardly, slightly radially inwardly opening recess for receiving the inner peripheral part of the cover member 25 in elastically, snap-on pry-off relationship, the terminal end of the metal tab being formed to extend radially outwardly as at 31 to afford a centering surface against which the inner edge of the cover member may be disposed during the assembly operation.

It will be clearly seen from Figure 1 that the junctions between the terminal ends 31 and the arcuate portions 30 of the aforementioned tabs comprise, in effect, radially inwardly facing humps 32 over which the inner edge of the cover member 25 must be pressed in order to obtain the aforementioned retaining relationship with the wheel structure. This retaining relationship is maintained in view of the fact that the diameter of the circle described by the radially inner extremities of the humps 32 is smaller than the diameter of the circle described by the radially outer extremity of the bead 27 of the cover member 25. Thus the cover member will be elastically compressed or distorted as it passes over the peaks of the humps whereupon it will again assume its normal, enlarged shape to fit tightly within the groove afforded by the arcuate portions 30 of the aforementioned tabs. To the end that the cover 25 may be quickly and easily removed from the wheel structure, it is merely necessary to flex the outer peripheral part thereof away from the side wall of the tire 17 and the edge portion 16 of the tire rim 10, as shown in Figure 3. Thereafter, a suitable tool T, such as a screw driver, may be inserted so that an intermediate part thereof bears against the edge portion 16 of the tire rim and the tip thereof bears against an axially inner part of the bead 27 at a point thereon intermediate two of the retaining members 28. Upon axially inward swinging of the handle of the tool the bead 27 will be forced axially outwardly over the peaks of the humps 32 of the retaining means 28 to be released therefrom.

In Figures 4, 5 and 6, there is disclosed a modified form of my invention including a retaining arrangement which is adapted for use with a cover such as that shown at 25 in Figures 1, 2 and 3 and which is disclosed herein in conjunction with an annulus 33 which may, if desired, be formed from a resiliently flexible material or from sheet metal. The annular trim member 33 is provided at its outer edge with a turned back portion 34 which is arranged to bear against the outer surface of the edge portion 16a of the tire rim 10a when secured to the wheel structure in a manner to be presently described. The inner marginal portion of the cover member 33 is turned back thereon as at 35 to provide a substantially radially outwardly extending flange terminating in a flexible edge 36 arranged to be sprung over spaced bumps 37 formed on the body portion 12b of the wheel structure at a radially outer part thereof. In assembling the cover member 33 upon the wheel structure it is merely necessary that it be urged axially inwardly relative to the wheel structure whereby the flexible edge 36 overrides the respective bumps 37 to be lodged at the axially inner side thereof whereby the portion 34 at the outer periphery thereof is drawn into bearing engagement with the edge portion 16a of the tire rim 10a as previously described.

As has been indicated, the outer peripheral part of both of the cover members disclosed herein is retained in pressure engagement with the adjacent portion of the wheel structure whether it be the side wall of a tire therein as shown in Figures 1, 2 and 3 or the outer surface of the edge portion 16a as shown in Figure 4. This pressure engagement is attained by virtue of the fact that the cover members are so cross-sectionally configurated that as they are applied to the wheel structure the radially outer part thereof engages the wheel structure before the radially inner margin thereof has completed its axial inward movement for retention upon the wheel structure. In this manner the cover members are slightly distorted cross-sectionally and thus are placed under a condition of stress whereby the retention thereof upon the wheel structure is considerably augmented.

From the foregoing it will be seen that there is provided herein a novel retaining arrangement for securing an improved cover member over the outer side of a wheel structure, the retaining arrangement comprising a retaining engagement between the cover member and a portion of the wheel structure at the radially outer part of the central load bearing portion thereof. It will also be seen that the cover members disclosed herein are of such cross-sectional magnitude that they substantially conceal the outer side of the tire rim and extend radially inwardly over the wheel structure to conceal the junction between the tire rim and the central load bearing portion thereof.

With regard to the cover assembly disclosed in Figures 1, 2 and 3 it is to be noted that the attaching or retaining arrangement is such that flexure of the cover member may be accomplished by movement thereof about the adjacent portion of the inner peripheral margin, the retaining means and other parts of the wheel structure being so arranged that unobstructed, axially outward flexing of the cover member may occur. Under these circumstances it will be seen that the bending stresses imposed upon the cover during flexure thereof are distributed evenly throughout the body thereof and are not concentrated at any localized point as would be the case if some part of the wheel structure obstructed the free movement of the cover before completion of the desired flexing action. In this manner severe localized bending strains are entirely avoided during flexure of the cover.

Another attribute of my invention concerns the reduction of the unsprung weight of the vehicle with which it is associated. This is accomplished first by the provision of a cover assembly having less weight than those heretofore mentioned and further by the provision of an attachment arrangement wherein auxiliary parts, additional to the cover assembly and the wheel assembly, are not required in order to obtain efficient retaining engagement between the cover and the wheel.

What I claim is:

In a wheel structure having a tire rim and a central load bearing portion secured thereto, retaining means for securing a circular cover over the outer side of the wheel structure, said retaining means including circumferentially spaced integral tabs struck from the body of the central load bearing portion and formed to extend substantially axially outwardly of the wheel structure and to provide a recess for receiving an attachment part of the cover member disposed over the wheel structure in snap-on pry-off engagement, said integral tabs terminating in radially extending end portions arranged to afford guiding means for the attachment part of a cover member to direct the same into the respective recess for attachment therein.

GEORGE ALBERT LYON.